United States Patent
Ko et al.

(10) Patent No.: US 7,894,858 B2
(45) Date of Patent: Feb. 22, 2011

(54) USER SELECTION APPARATUS AND METHOD FOR SDMA IN A MIMO SYSTEM

(75) Inventors: Kyun-Byoung Ko, Hwasung-si (KR); Won-Il Roh, Yongin-si (KR); Jeong-Tae Oh, Yongin-si (KR); Jae-Ho Jeon, Sungnam-si (KR); Seung-Joo Maeng, Sungnam-si (KR); Chan-Byoung Chae, Seoul (KR)

(73) Assignee: Samsung Electronics Co., Ltd (KR)

( * ) Notice: Subject to any disclaimer, the term of this patent is extended or adjusted under 35 U.S.C. 154(b) by 1306 days.

(21) Appl. No.: 11/441,371

(22) Filed: May 25, 2006

(65) Prior Publication Data

US 2006/0268776 A1 Nov. 30, 2006

(30) Foreign Application Priority Data

May 25, 2005 (KR) ........................ 10-2005-0043912

(51) Int. Cl.
H04M 1/00 (2006.01)

(52) U.S. Cl. .................. 455/562.1; 455/441.1; 455/445; 370/329

(58) Field of Classification Search .................. 370/329; 455/562.1, 441.1, 445

See application file for complete search history.

(56) References Cited

U.S. PATENT DOCUMENTS

| 6,409,897 | B1 | 6/2002 | Wingo |
| 6,787,011 | B2 | 9/2004 | Ueda et al. |
| 7,519,022 | B2 * | 4/2009 | Yu et al. ..................... 370/329 |
| 2001/0047936 | A1 | 12/2001 | McLeod |
| 2002/0101832 | A1 * | 8/2002 | Chen et al. .................. 370/318 |
| 2003/0087673 | A1 * | 5/2003 | Walton et al. ............... 455/562 |
| 2003/0136662 | A1 | 7/2003 | Ueda et al. |
| 2005/0224342 | A1 | 10/2005 | Landgraf et al. |

FOREIGN PATENT DOCUMENTS

| DE | 102 31 203 A1 | 2/2004 |
| DE | 10 2004 031 161 A1 | 1/2005 |
| KR | 1020050015730 | 2/2005 |
| KR | 1020050034476 | 4/2005 |

* cited by examiner

*Primary Examiner*—Vincent P Harper
*Assistant Examiner*—Fred A Casca
(74) *Attorney, Agent, or Firm*—The Farrell Law Firm, P.C.

(57) ABSTRACT

An apparatus and method for selecting at least two users to be serviced in SDMA in an SDMA wireless communication system are provided. All users are ordered according to a predetermined rule and all possible user combinations each having at least two users are created from the ordered users. An investigation limit number is set using the capacity of a $j^{th}$ user combination. Or a total investigation number is reduced by comparing the interference-reflected SNR decrements of users with an investigation threshold. Therefore, the computation volume for selecting SDMA users is decreased.

27 Claims, 4 Drawing Sheets

USER SELECTION APPARATUS AND METHOD FOR SDMA IN A MIMO SYSTEM

PRIORITY

This application claims priority under 35 U.S.C. §119 to an application entitled "User Selection Apparatus And Method For SDMA In A MIMO System" filed in the Korean Intellectual Property Office on May 25, 2005 and assigned Serial No. 2005-43912, the contents of which are incorporated herein by reference.

BACKGROUND OF THE INVENTION

1. Field of the Invention

The present invention relates generally to a user selection apparatus and method for implementing Spatial Division Multiple Access (SDMA) in a Multiple Input Multiple Output (MIMO) system, and in particular, to an apparatus and method for selecting users with a reduced computation volume in a MIMO system supporting SDMA.

2. Description of the Related Art

With the recent advent of the wireless multimedia era, the rapid increasing demands for high-speed transmission of a large amount of data on radio channels have driven the worldwide development of wireless, high-speed data transmission systems to support Internet service on mobile channels and wireless channels.

For mobile, wireless Internet services, MIMO has attracted a lot of attention as a prominent scheme of increasing data rate.

The MIMO system, using a plurality of transmit and receive antennas, offers high data rates and outperforms a non-MIMO system in terms of the capacity of a radio link between a transmitter and a receiver. Under a multipath-rich environment, a plurality of orthogonal channels can be generated between the transmitter and the receiver. Hence, data for a single user can be sent by radio resources in parallel on the orthogonal channels with higher spectral efficiency, although using the same bandwidth as in the non-MIMO system.

Furthermore, since the MIMO system supports SDMA, Signal-to-Noise Ratio (SNR) is improved and higher data rates are available.

FIG. 1 is a flowchart illustrating a conventional operation for selecting SDMA users in a Base Station (BS) in a MIMO-SDMA system. The following description is based on the assumption that U SDMA users are selected from among K users using a single receive antenna (R=1), and the BS uses T antennas and has knowledge of channel information between the T antennas and the individual users. Notably, U is equal to or greater than 2 (U≧2).

Referring to FIG. 1, the BS generates all possible combinations of U users from K users in step 101.

In step 103, the BS calculates the capacity of a $j^{th}$ user combination by Equation (1), Equation (2), Equation (3) and Equation (4) set forth below. j is the index of the total $_KC_U$ combinations and its initial value is 1.

A weight vector for the $j^{th}$ user combination is calculated using the channel information H of the U users in the $j^{th}$ user combination by $$W_{ZF} = H^H(HH^H)^{-1} = [W^1, W^2, \ldots, W^U] \quad (1)$$

where $W_{ZF}$ denotes a zero-forcing weight vector and H denotes the total channel matrices $[H^1, H^2, H^3, \ldots, H^U]^T$ of the U users each having R receive antennas. Hu is the channel matrices between the T transmit antennas of the BS and the R receive antennas of a $U^{th}$ user, $[H_1^U, H_2^U, H_3^U, \ldots, H_R^U]^T$, where $H_R^U$ denotes the channel matrix between the T transmit antennas of the BS and an $R^{th}$ receive antenna of the $U^{th}$ user, $[H_{R,1}^U, H_{R,2}^U, H_{R,3}^U, \ldots, H_{R,T}^U]^T$. $H_{R,T}^U$ denotes the channel between a $T^{th}$ transmit antenna of the BS and the $R^{th}$ receive antenna of the $U^{th}$ user.

Using the weight vector $W_{ZF}$, a power scaling factor of each user is calculated by $$P_u = 1/|W^u|^2 \quad (2)$$

where $W^u$ denotes a weight column vector $[W_1^u, W_2^u, \ldots, W_T^u]^T$ applied to the T transmit antennas for a $u^{th}$ user.

The SNRs of the U users are calculated using their power scaling vectors. For the $u^{th}$ user in the $j^{th}$ user combination, $$SNR_u = \frac{P_u |S^u|^2}{\sigma_u^2} = \frac{|S^u|^2/|W^u|^2}{\sigma_u^2} \quad (3)$$

where $P_u$ denotes the power scaling factor of the $u^{th}$ user calculated by Equation (2), $S^u$ denotes a transmission symbol transmitted in SDMA to the $u^{th}$ user, and $\sigma_u^2$ denotes the noise power of the $u^{th}$ user.

Using the SNRs of the users, the total capacity of the $j^{th}$ user combination, $C_j^{total}$ is given by $$C_j^{total} = \sum_{u=1}^{U} \log_2(1 + SNR_u) \quad (4)$$

After calculating the total capacity of the $j^{th}$ user combination, the BS compares j with $_kC_u$ to determine whether the capacity of every user combination has been calculated in step 105. If j is less than $_kC_u$ (j<$_kC_u$), which implies that there still remain user combinations whose capacities are to be calculated, the BS increases j by 1 (j=j+1) in step 107 and returns to step 103.

On the other hand, if j is equal to or greater than $_kC_u$ (j≧$_kC_u$), which implies that the capacity of every user combination has been calculated, the BS selects a user combination that maximizes capacity and transmits data to the users of the selected user combination in SDMA in step 109. Then the BS ends this algorithm.

As described above, the conventional MIMO system generates all possible user combinations from total users to select SMDA users, calculates the capacity of every user combination, and selects a user combination offering the maximum capacity. Therefore, a large volume of computation is required.

SUMMARY OF THE INVENTION

An object of the present invention is to substantially solve at least the above problems and/or disadvantages and to provide at least the advantages below. Accordingly, an object of the present invention is to provide an apparatus and method for selecting SDMA users in a MIMO system.

Another object of the present invention is to provide an apparatus and method for reducing the computation volume of SDMA user selection in a MIMO system.

According to one aspect of the present invention, in an apparatus for selecting U users (U≧2) to be serviced in SDMA in an SDMA wireless communication system, a channel information storage stores channel information of total users. A user selector generates user combinations each having U users from the total users according to the channel information, calculates an investigation limit number according to the capacities of the user combinations, and selects users to be serviced in SDMA according to the investigation limit number.

According to another aspect of the present invention, in an apparatus for selecting U users (U≧2) to be serviced in SDMA in an SDMA wireless communication system, a channel information storage stores channel information of total users. A user selector generates user combinations each having U users from the total users according to the channel information, and selects users to be serviced in SDMA by comparing interference-reflected SNR decrements of the user combinations with an investigation threshold.

According to a further aspect of the present invention, in a method of selecting U users (U≧2) to be serviced in SDMA in an SDMA wireless communication system, total users are ordered according to channel status, user combinations each having U users are generated from the ordered users, and the capacity of a $j^{th}$ user combination is calculated. An investigation limit number is determined by comparing interference-reflected SNRs of the users of the $j^{th}$ user combination with maximum SNRs of the total users, if the capacity of the $j^{th}$ user combination is greater than the capacities of previous user combinations. The investigation limit number is compared with j and, if j is equal to or greater than the investigation limit number, a user combination with the largest capacity is selected.

According to still another aspect of the present invention, in a method of selecting U users (U≧2) to be serviced in SDMA in an SDMA wireless communication system, a maximum investigation number and an investigation threshold ($SNR_{(Deg)}$) are set. Total users are ordered according to channel status, user combinations each having U users are generated from the ordered users, and an SNR decrement ($SNR_{u(Deg)}$) of a $j^{th}$ user combination is calculated. It is determined whether SNR decrements of all users of the $j^{th}$ user combination have been compared with the investigation threshold, if $SNR_{u(Deg)}$ is equal to or greater than $SNR_{(Deg)}$. The $j^{th}$ user combination is selected as a user combination having the largest capacity, if the SNR decrements of all users of the $j^{th}$ user combination have been compared with the investigation threshold.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is directed to a method of selecting SMDA users in a BS in a MIMO communication system.

Figure 1:
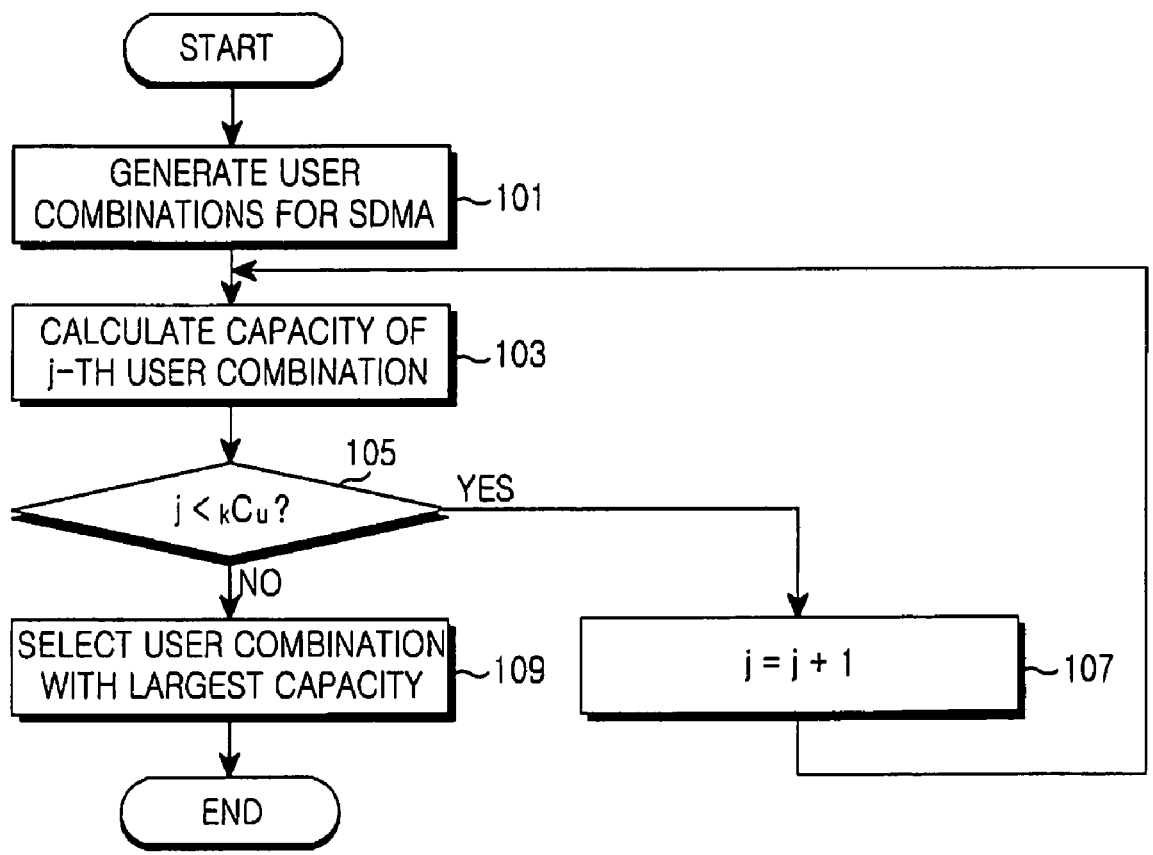
FIG. 1 is a flowchart illustrating a conventional operation for selecting SDMA users in a BS in a MIMO system.
Figure 2:
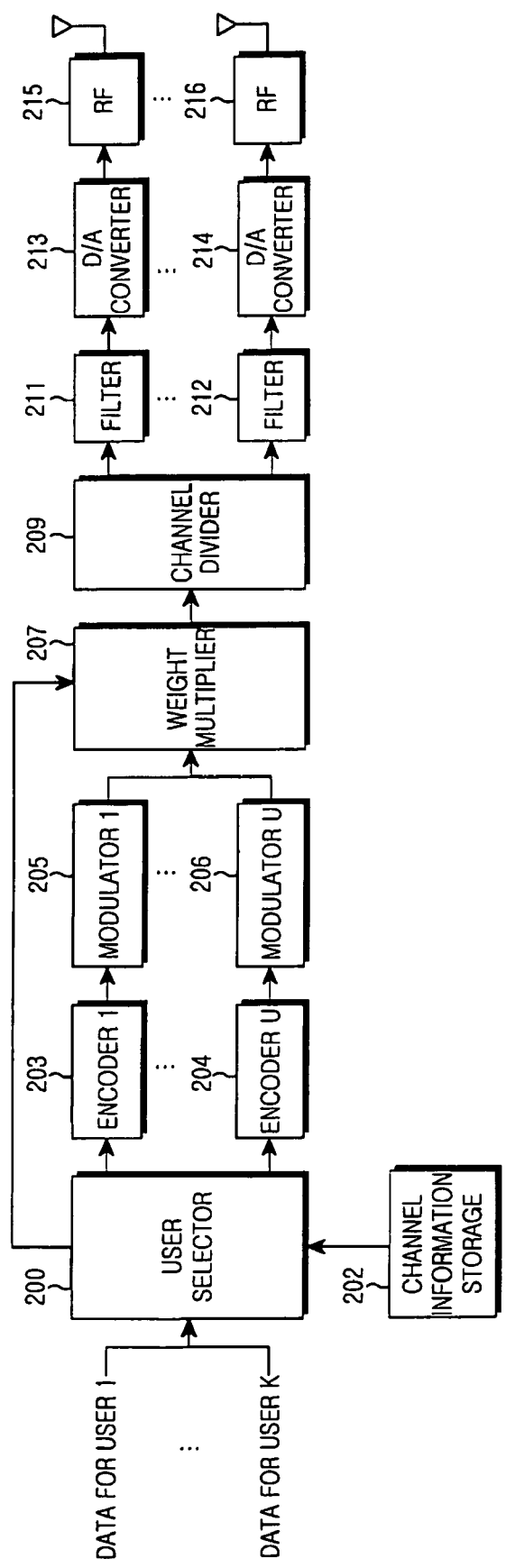
FIG. 2 is a block diagram of a BS for implementing SDMA according to the present invention.

FIG. 2 is a block diagram of a BS for implementing SDMA according to the present invention.

Referring to FIG. 2, to implement SDMA by selecting U users from K users in a BS using T antennas, a user selector 200 selects data for U users from data destined for the K users based on the channel information of the K users received from a channel information storage 202 and calculates a weight vector for the selected U users, which will be described later in more detail with reference to FIGS. 3 and 4. Encoders 203 to 204 encode the data for the U users at a predetermined coding rate.

Modulators 205 to 206 modulate the coded data of the U users in a predetermined modulation scheme. The modulation scheme can be one of Binary Phase Shift Keying (BPSK), Quadrature Phase Shift Keying (QPSK), Quadrature Amplitude Modulation (QAM), Pulse Amplitude Modulation (PAM), and Phase Shift Keying (PSK).

A weight multiplier 207 multiplies the modulated data by the weight vector received form the user selector 200. A channel divider 209 divides the weighted data by the number of the transmit antennas T in order to transmit the data separately through the T antennas.

After passing through filters 211 to 212, the divided signals are converted to analog signals by Digital to Analog (D/A) converters 213 to 214, converted to Radio Frequency (RF) signals by RF processors 215 to 216, and then transmitted through the antennas.

Now a description will be made of a method of reducing the number of investigated user combinations in order to reduce the computation volume required for SDMA user selection in the MIMO system, and a method of using an SNR decrease caused by channel correlation. A user combination is a group of U users selected from K users, for SDMA.

Figure 3:
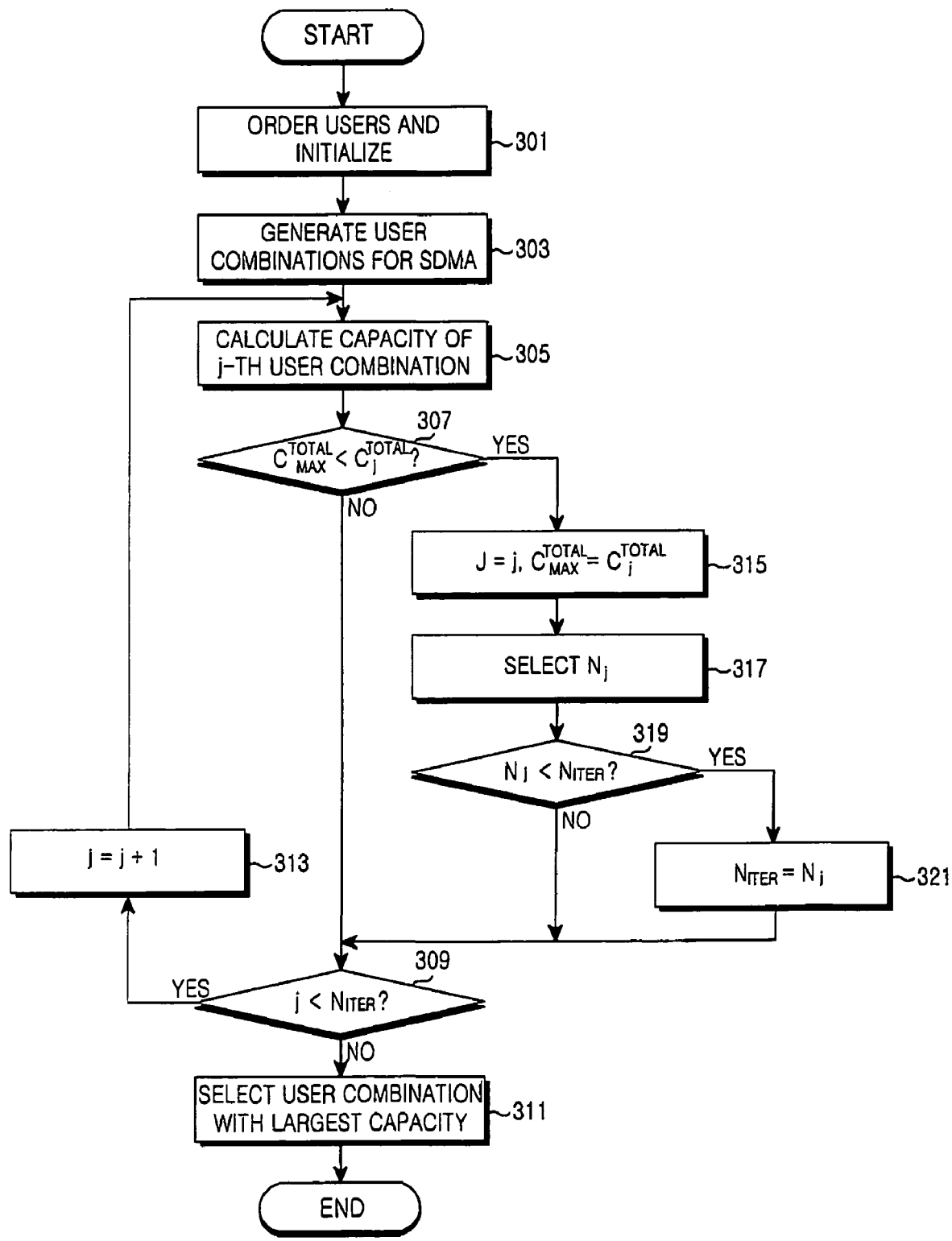
FIG. 3 is a flowchart illustrating an operation for selecting SDMA users in the BS in the MIMO system according to the present invention.

The method of reducing the computation volume required for SDMA user selection by decreasing the number of user combinations to be investigated is shown in FIG. 3.

FIG. 3 is a flowchart illustrating an operation for selecting SDMA users in the BS in the MIMO system according to the present invention. It is assumed herein that U users are selected from K users each having a single antenna to implement SDMA, and the BS uses T antennas (THU) and has knowledge of the channel information between the T antennas and each user. U is equal to or greater than 2 (U≧2).

Referring to FIG. 3, the BS performs initialization to select SDMA users in step 301. For example, the K users are ordered in a descending order of SNR, $SNR_k^{Pre}$ or channel power, $|H_l^k|^2$ and a maximum investigation number $N_{iter}$ is set to the total number of user combinations, $_KC_U$. The index of a user combination with the maximum capacity, J and the maximum capacity $C_{MAXx}^{Total}$ are each set to 0, and an index j indicating a user combination is set to an initial value of 0.

After the initialization, the BS generates all possible user combinations each having U users from the K users in step 303.

In step 305, the BS calculates the capacity of the $j^{th}$ user combination by Equation (1), Equation (2), Equation (3) and Equation (4). Specifically, the weight vector $W_{ZF}$ of the $j^{th}$ user combination is calculated using the channel information H of the U users of the $j^{th}$ user combination by Equation (1) and the power scaling factors $P_u$ of the individual users in the $j^{th}$ user combination are calculated by Equation (2). Then the SNRs of the users, $SNR_u$ are calculated based on the power scaling factors $P_u$. Finally, the total capacity of the $j^{th}$ user combination, $C_j^{total}$ is calculated using $SNF_u$ by Equation (4).

In step 307, the BS compares $C_j^{total}$ with $C_{MAX}^{Total}$. If $C_j^{total}$ is equal to or less than $C_{MAX}^{Total}$ ($C_{MAX}^{Total} \geq C_j^{total}$), the BS proceeds to step 309. If $C_j^{total}$ is greater than $C_{MAX}^{Total}$ ($C_{MAX}^{Total} \leq C_j^{total}$), the BS sets J to j (J=j) and $C_j^{total}$ to $C_{MAX}^{Total}$ ($C_{MAX}^{Total} = C_j^{total}$) in step 315.

In step 317, the BS selects an investigation limit number $N_j$. Each of the SNRs of the users in the $j^{th}$ user combination is compared with the SNRs of the K users ordered in a descending order, $SNR^{Pre}$ and users having $SNR^{Pre}$ equal to or greater than $SNR_u$ ($SNR^{Pre} \geq SNR^u$) are selected. $SNR_u$ is the SNR of the $u^{th}$ user of the $j^{th}$ user combination when SDMA is provided to the users of the $j^{th}$ user combination, and $SNR^{Pre}$ is the SNR of the $u^{th}$ user when a multiple-antenna service is provided only to the $u^{th}$ user.

For each user of the $j^{th}$ user combination, a user having the highest user index, $K_u$, is chosen from among the selected users. For example, given two users, user 1 and user 2, in the $j^{th}$ user combination, a user having the highest index, $K_1$, is selected among the users having $SNR^{Pre}$ equal to or greater than $SNR^u$, for user 1 and a user having the highest index, $K_2$ is selected among the users having $SNR^{Pre}$ equal to or greater than $SNR^u$, for user 2. The index of a user combination including the users $K_u$ is set as the investigation limit number, $N_j$. $K_u < K_{u+1}$ (u=1, 2, . . . , U−1). If U=2, $K_1$ must be less than $K_2$. If $K_1$ is greater than $K_2$, $N_j$ is set to a one level-higher user combination index. The user combination with this index includes $k_1$.

In step 319, the BS compares $N_{iter}$ with $N_j$. If $N_j \geq N_{iter}$, the BS goes to step 309. If $N_j < N_{iter}$, the BS sets $N_{iter}$ to $N_j$ in step 321.

In step 309, the BS compares j with $N_{iter}$. If $j < N_{iter}$, the BS increases j by 1 (j=j+1) in step 313 and returns to step 305. If $j \geq N_{iter}$, the BS selects a user combination with the maximum capacity in step 311. The BS then sends data to the users of the selected user combination in SDMA and ends this algorithm.

Now a description will be made of a method of reducing the computation volume required for selecting SDMA users by setting a threshold $SNR_{(Deg)}$ for discontinuing investigation of users combinations based on a channel correlation-incurred SNR decrease. This method is described in FIG. 4.

Figure 4:
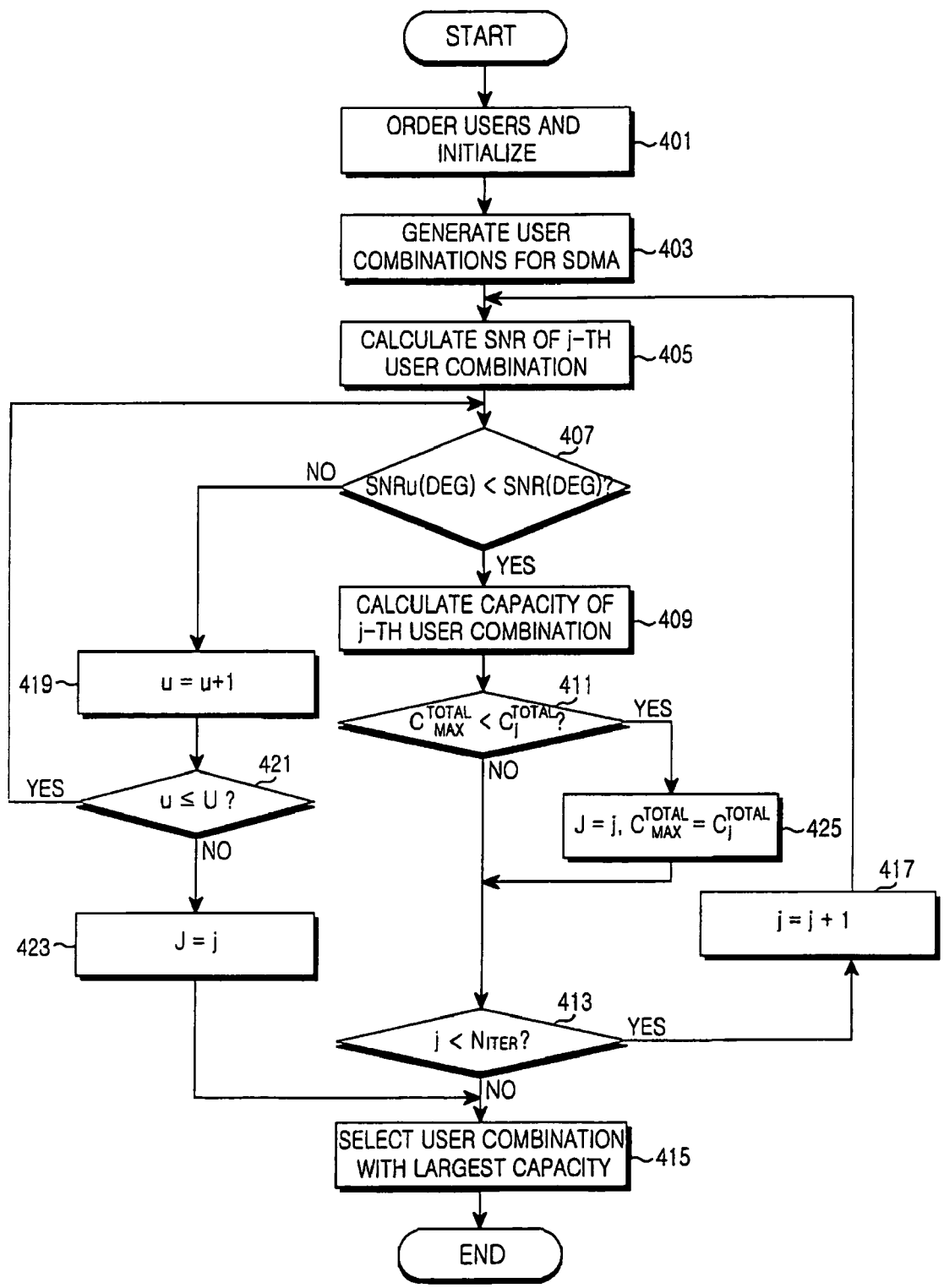
FIG. 4 is a flowchart illustrating an operation for selecting SDMA users in the BS in the MIMO system according to the present invention.

FIG. 4 is a flowchart illustrating an operation for selecting SDMA users in the BS in the MIMO system according to the present invention. It is assumed herein that U users are selected from K users each having a single antenna in order to implement SDMA, and the BS uses T antennas and has knowledge of the channel information between the T antennas and each user. U is equal to or greater than 2 (U≧2). A maximum investigation number $N_{iter}$ is less than the total number of user combinations, $_KC_U$ ($N_{iter} <\ _KC_U$) and can be adjusted appropriately according to the computation ability of the BS.

Referring to FIG. 4, the BS performs initialization to select SDMA users in step 401. For example, the K users are ordered in a descending order of SNR, $SNR_k^{Pre}$ or channel power, $|H_1^k|^2$ and the maximum investigation number $N_{iter}$ is set. A threshold $SNR_{(Deg)}$ for stopping investigation based on a channel correlation-incurred SNR decrease is set, the index of a user combination with the maximum capacity, J, and a maximum capacity $C_{MAX}^{total}$ are each set to 0, and an index j indicating a user combination is set to an initial value of 0.

After the initialization, the BS generates all possible user combinations each having U users from the K users in step 403.

In step 405, the BS calculates the channel correlation-incurred SNR decrement of the $j^{th}$ user combination by Equation (1), Equation (2), Equation (3) and Equation (5). Specifically, the weight vector $W_{ZF}$ of the $j^{th}$ user combination is calculated using the channel information H of the U users of the $j^{th}$ user combination by Equation (1) and the power scaling factors $P_u$ of the individual users in the $j^{th}$ user combination are calculated by Equation (2). Then the SNRs of the users, $SNR_u$ are calculated based on the power scaling factors $P_u$. Finally, $SN_u$ is expressed in dB by $$SNR_u(\text{dB}) = 10\log\left(\frac{|H_1^u|^2|S^u|^2}{\sigma_u^2}\right) + 10\log\left(\frac{1}{|W_1^u|^2|H_1^u|^2}\right) \quad (5)$$
$$= SNR_{u(MAX)}(\text{dB}) + SNR_{u(Deg)}(\text{dB})$$

where $SNR_u(\text{dB})$ denotes $SNR_u$ in dB, $H_1^u$ denotes the channels between the T antennas and a first receive antenna of the $u^{th}$ user, $S^u$ denotes a transmission symbol transmitted to the $u^{th}$ user in SDMA, $\sigma_u^2$ denotes the noise power of the $u^{th}$ user, $W^u$ denotes a weight factor used for the $u^{th}$ user by the BS, $SNR_{u(MAX)}(\text{dB})$ denotes the maximum SNR of the $u^{th}$ user, and $SNR_{u(Deg)}(\text{dB})$ denotes the channel correlation-incurred SNR decrement of the $u^{th}$ user. Here, u denotes a user index in the $j^{th}$ user combination and its initial value is 1.

After calculating $SNR_{u(Deg)}$, the BS compares $SNR_{(Deg)}$ with $SNR_{u(Deg)}$ in step 407. $SNR_{u(Deg)}$ is a negative value. If $SNR_{u(Deg)} \geq SNR_{(Deg)}$, the BS increases u by 1 in step 419.

In step 421, the BS compares the increased u with U. If $u \leq U$, the BS returns to step 407 and calculates the SNR decrements of the remaining users of the $j^{th}$ user combination. If u>U, that is, if the SNR decrements of the users in the $j^{th}$ user combination are less than or equal to the threshold, the BS sets J to j (J=1) in step 423 and goes to step 415.

If $SNR_{u(Deg)} < SNR_{(Deg)}$, the BS calculates the capacity $C_j^{total}$ of the $j^{th}$ user combination by computing Equation (4) using the SNRs of the users of the $j^{th}$ user combination calculated by Equation (3) in step 409.

In step 411, the BS compares $C_j^{total}$ with $C_{MAX}^{Total}$. If $C_j^{total}$ is equal to or less than $C_{MAX}^{Total}$ ($C_{MAX}^{Total} \geq C_j^{total}$), the BS proceeds to step 413. If $C_j^{total}$ is greater than $C_{MAX}^{Total}$ ($C_{MAX}^{Total} < C_j^{total}$), the BS sets J to j (J=j) and $C_j^{total}$ to $C_{MAX}^{Total}$ ($C_{MAX}^{Total} = C_j^{total}$) in step 425.

In step 413, the BS compares j with $N_{iter}$. If j is less than $N_{iter}$ (j<$N_{iter}$), the BS increases j by 1 in step 417 and returns to step 405. If j is equal to or greater than $N_{iter}$ (j≧$N_{iter}$), the BS selects the user combination J with the largest capacity and sends data to the users of the selected user combination in SDMA in step 415. Then the BS terminates the algorithm.

In accordance with the present invention as described above, the BS in the MIMO system limits the number of user combinations to be investigated based on SNR or SNR decrement in selecting SDMA users. Therefore, the computation volume involved in the user selection can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for selecting at least two users to be serviced in a wireless communication system, comprising:
 a channel information storage for storing channel information of all users; and
 a user selector for generating user combinations each having at least two users from all the users according to the channel information, calculating an investigation limit number according to capacities of the user combinations, and selecting users to be serviced according to the investigation limit number, wherein the user selector calculates the capacities of the user combinations until the investigation limit number, and selects a user combination with a largest capacity, and wherein the investigation limit number is a number of user combinations to be generated that is less than a number of all possible user combinations having at least two users.

2. The apparatus of claim 1, wherein the channel information includes maximum signal-to-noise ratios (SNRs) and channel power of all the users and interference-reflected SNRs of the users in the user combinations.

3. The apparatus of claim 1, wherein the user selector orders the users according to the channel information stored in the channel information storage, generates the user combinations each having at least two users from the ordered users, determines the investigation limit number by comparing the interference-reflected SNRs of the users in the user combinations with the maximum SNRs of the total users, calculates the capacities of user combinations ordered up to the investigation limit number, and selects a user combination with the largest capacity.

4. The apparatus of claim 1, wherein the user selector selects users having maximum SNRs greater than or equal to interference-reflected SNRs of each user in a $j^{th}$ user combination, and selects a user having a highest user index among the selected users, for each user of the $j^{th}$ user combination, and selects a user combination including the selected users having highest user indexes, if an index of a first user is less than an index of a second user following the first user in the user combination, and compares the index of the selected user combination with the current investigation limit number, and updating the current investigation limit number to the index of the selected user combination, if the index of the selected user combination is less than the current investigation limit number.

5. The apparatus of claim 4, wherein the user selector selects the user combination including the index of the first user, if the index of the first user is greater than the index of the second user.

6. An apparatus for selecting at least two users to be serviced in a Spatial Division Multiple Access (SDMA) wireless communication system, comprising:

a channel information storage for storing channel information of all users; and a user selector for generating user combinations each having at least two users from all the users according to the channel information, comparing interference-reflected signal-to-noise ratio (SNR) decrements of one or more individual users in the user combinations with an SNR investigation threshold, and selecting a user combination having a largest capacity among calculated capacities of user combinations when the interference-reflected SNR decrements of each user in a user combination are greater than or equal to the SNR investigation threshold, wherein a number of calculated capacities is less than a number of all possible user combinations having at least two users.

7. The apparatus of claim 6, wherein the channel information includes maximum SNRs and channel power of all the users and interference-reflected SNRs of the users in the user combinations.

8. The apparatus of claim 6, wherein the user selector orders the total users according to the channel information stored in the channel information storage, generates the user combinations each having at least two users from the ordered users, compares the interference-reflected SNR decrements of the users in the user combinations with the investigation threshold, and selects a user combination of which the SNR decrements of the users are equal to or greater than the investigation threshold.

9. The apparatus of claim 8, wherein the SNR decrements of the users and the investigation threshold are negative values.

10. The apparatus of claim 8, wherein the user selector sets a maximum investigation number, and in the absence of any user combination having the SNR decrements of the users being equal to or greater than the investigation threshold, calculates the capacities of user combinations ordered up to the maximum investigation number and selects the user combination with the largest capacity.

11. The apparatus of claim 6, wherein the investigation threshold is a channel correlation-caused SNR decrement.

12. A method of selecting at least two users to be serviced in a wireless communication system, comprising the steps of:

ordering all users according to channel status, generating user combinations each having at least two users from the ordered users, and calculating a capacity of a $j^{th}$ user combination among the user combinations;

determining an investigation limit number by comparing interference-reflected signal-to-noise ratios (SNRs) of the users of the $j^{th}$ user combination with maximum SNRs of all the users, if the capacity of the $j^{th}$ user combination is greater than capacities of previous user combinations; and comparing the investigation limit number with j and, if j is equal to or greater than the investigation limit number, selecting a user combination with the largest capacity;

wherein the investigation limit number is a number of user combinations to be generated that is less than a number of all possible user combinations having at least two users.

13. The method of claim 12, wherein the channel status is represented by the maximum SNRs or channel power of all the users.

14. The method of claim 12, further comprising, if the capacity of the $j^{th}$ user combination is greater than the capacities of the previous user combinations, updating a maximum capacity to the capacity of the $j^{th}$ user combination.

15. The method of claim 12, further comprising:

comparing the investigation limit number with j, if the capacity of the $j^{th}$ user combination is equal to or less than the capacities of the previous user combinations; and selecting a user combination with the largest capacity, if j is equal to or greater than the investigation limit number.

16. The method of claim 15, further comprising:

increasing j by 1, if j is less than the investigation limit number; and calculating the capacity of a user combination corresponding to the increased j.

17. The method of claim 12, wherein the investigation limit number determining step comprises:

selecting users having maximum SNRs greater than or equal to the interference-reflected SNRs of each of the users in the $j^{th}$ user combination;

selecting a user having the highest user index among the selected users, for the each user of the $j^{th}$ user combination;

selecting a user combination including the selected users having the highest user indexes, if the index of a first user is less than the index of a second user following the first user in the user combination; and comparing the index of the selected user combination with a current investigation limit number, and updating the current investigation limit number to the index of the selected user combination, if the index of the selected user combination is less than the current investigation limit number.

18. The method of claim 17, further comprising, if the index of the first user is greater than the index of the second user, selecting a user combination including the index of the first user.

19. The method of claim 12, further comprising:
increasing j by 1 if j is less than the investigation limit number; and
calculating the capacity of a user combination corresponding to the increased j.

20. A method of selecting at least two users to be serviced in a wireless communication system, comprising the steps of:
setting a maximum investigation number and a signal-to-noise (SNR) investigation threshold ($SNR_{(Deg)}$);
ordering all users according to channel status, generating user combinations each having at least two users from the ordered users, and calculating an SNR decrement ($SNR_{u(Deg)}$) of a user in a $j^{th}$ user combination;
determining whether SNR decrements of all users of the $j^{th}$ user combination have been compared with $SNR_{(Deg)}$, if $SNR_{u(Deg)}$ is equal to or greater than $SNR_{(Deg)}$; and
selecting a user combination having a largest capacity among calculated capacities of user combinations, if the SNR decrements of all users of the $j^{th}$ user combination are greater than or equal to $SNR_{(Deg)}$, wherein a number of calculated capacities is less than a number of all possible user combinations having at least two users.

21. The method of claim 20, wherein the channel status is represented by the maximum SNRs or channel power of all the users.

22. The method of claim 20, wherein the investigation threshold is a channel correlation-incurred SNR decrement.

23. The method of claim 20, wherein the SNR decrements of the users and the investigation threshold are negative values.

24. The method of claim 20, further comprising comparing the SNR decrement of a next user in the $j^{th}$ user combination with the investigation threshold, if all users in the $j^{th}$ user combination have not been compared with the investigation threshold.

25. The method of claim 20, further comprising:
calculating the capacity ($C_j^{total}$) of the $j^{th}$ user combination and comparing $C_j^{total}$ with the maximum capacity ($C_{MAXx}^{Total}$), if $SNR_{u(Deg)}$ is less than $SNR_{(Deg)}$;
updating $C_{MAXx}^{Total}$ to $C_j^{total}$, if $C_j^{total}$ is greater than $C_{MAXx}^{Total}$;
comparing j with the maximum investigation number; and
selecting a user combination with the largest capacity among the calculated capacities of user combinations, if j is equal to or greater than the maximum investigation number.

26. The method of claim 25, further comprising maintaining $C_{MAXx}^{Total}$, if $C_j^{total}$ is equal to or less than $C_{MAXx}^{Total}$.

27. The method of claim 25, further comprising:
increasing j by 1, if j is less than the maximum investigation number; and
calculating an SNR decrement of a user combination corresponding to the increased j.

* * * * *